(12) United States Patent
Duraisamy Soundrapandian et al.

(10) Patent No.: US 11,256,712 B2
(45) Date of Patent: Feb. 22, 2022

(54) RAPID DESIGN, DEVELOPMENT, AND REUSE OF BLOCKCHAIN ENVIRONMENT AND SMART CONTRACTS

(71) Applicant: Accenture Global Solutions Limited, Dublin (IE)

(72) Inventors: Pradeepkumar Duraisamy Soundrapandian, Sivakasi (IN); Kapil Singi, Bangalore (IN); Vikrant Kaulgud, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 708 days.

(21) Appl. No.: 15/969,508

(22) Filed: May 2, 2018

(65) Prior Publication Data

US 2019/0243912 A1 Aug. 8, 2019

Related U.S. Application Data

(60) Provisional application No. 62/626,236, filed on Feb. 5, 2018.

(51) Int. Cl.
*G06Q 50/00* (2012.01)
*G06F 16/27* (2019.01)
*G06F 9/455* (2018.01)

(52) U.S. Cl.
CPC .......... *G06F 16/27* (2019.01); *G06F 9/45558* (2013.01); *G06Q 50/00* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 10,146,792 | B1 * | 12/2018 | Dobrek | G06Q 20/0655 |
| 10,698,956 | B2 * | 6/2020 | Byron | G06F 40/12 |
| 10,733,616 | B1 * | 8/2020 | Rutley | G06Q 30/018 |
| 2017/0287090 | A1 * | 10/2017 | Hunn | H04L 9/0643 |

(Continued)

OTHER PUBLICATIONS

P. Zhang, M. A. Walker, J. White, D. C. Schmidt and G. Lenz, "Metrics for assessing blockchain-based healthcare decentralized apps," 2017 IEEE 19th International Conference on e-Health Networking, Applications and Services (Healthcom), 2017, pp. 1-4, doi : 10.1109/HealthCom.2017.8210842. (Year: 2017).*

*Primary Examiner* — Maria C Santos-Diaz
(74) *Attorney, Agent, or Firm* — Harrity & Harrity, LLP

(57) ABSTRACT

In some possible implementations, a device may include one or more memories and one or more processors, communicatively coupled to the one or more memories, to: receive a document that includes a plurality of clauses relating to two or more entities; identify a selected clause, of the plurality of clauses, based on a characteristic of the selected clause; determine a domain-specific language (DSL) unit based on the selected clause, the DSL unit identifying the two or more entities and values associated with the selected clause, identified by the selected clause, associated with the two or more entities; automatically generate a smart contract based on the DSL unit, the smart contract being configured to enforce a condition or action, of the values, between the two or more entities; and perform an action based on the smart contract.

20 Claims, 12 Drawing Sheets

(56) References Cited

U.S. PATENT DOCUMENTS

| | | | | |
|---|---|---|---|---|
| 2018/0005186 A1* | 1/2018 | Hunn | ................... | G06F 40/103 |
| 2018/0075527 A1* | 3/2018 | Nagla | .................. | G06Q 40/025 |
| 2018/0082024 A1* | 3/2018 | Curbera | ................. | G06F 21/00 |
| 2018/0315141 A1* | 11/2018 | Hunn | ...................... | G06F 16/93 |
| 2018/0365201 A1* | 12/2018 | Hunn | ...................... | H04L 9/3239 |
| 2019/0005029 A1* | 1/2019 | Mills | .................. | G06K 9/00469 |
| 2019/0042620 A1* | 2/2019 | Garagiola | ............ | G06F 16/2453 |
| 2019/0102850 A1* | 4/2019 | Wheeler | ............... | G06Q 20/102 |
| 2019/0132130 A1* | 5/2019 | Anantha | .................. | G06F 16/23 |
| 2019/0171438 A1* | 6/2019 | Franchitti | .............. | G06N 5/022 |
| 2019/0198144 A1* | 6/2019 | Blackley | ................. | G06F 16/27 |
| 2019/0205636 A1* | 7/2019 | Saraswat | ................. | G06F 16/93 |
| 2019/0207751 A1* | 7/2019 | Harvey | ................. | H04L 67/104 |
| 2019/0236548 A1* | 8/2019 | Singi | .................... | G06Q 20/356 |
| 2020/0118117 A1* | 4/2020 | McManus | ............... | G06Q 10/10 |
| 2020/0210519 A1* | 7/2020 | Wang | ..................... | H04L 9/0618 |
| 2020/0226285 A1* | 7/2020 | Bulleit | .................... | G06F 21/33 |
| 2020/0327378 A1* | 10/2020 | Smith | ..................... | G06N 5/048 |
| 2020/0387893 A1* | 12/2020 | Maim | ..................... | G06F 21/51 |

* cited by examiner

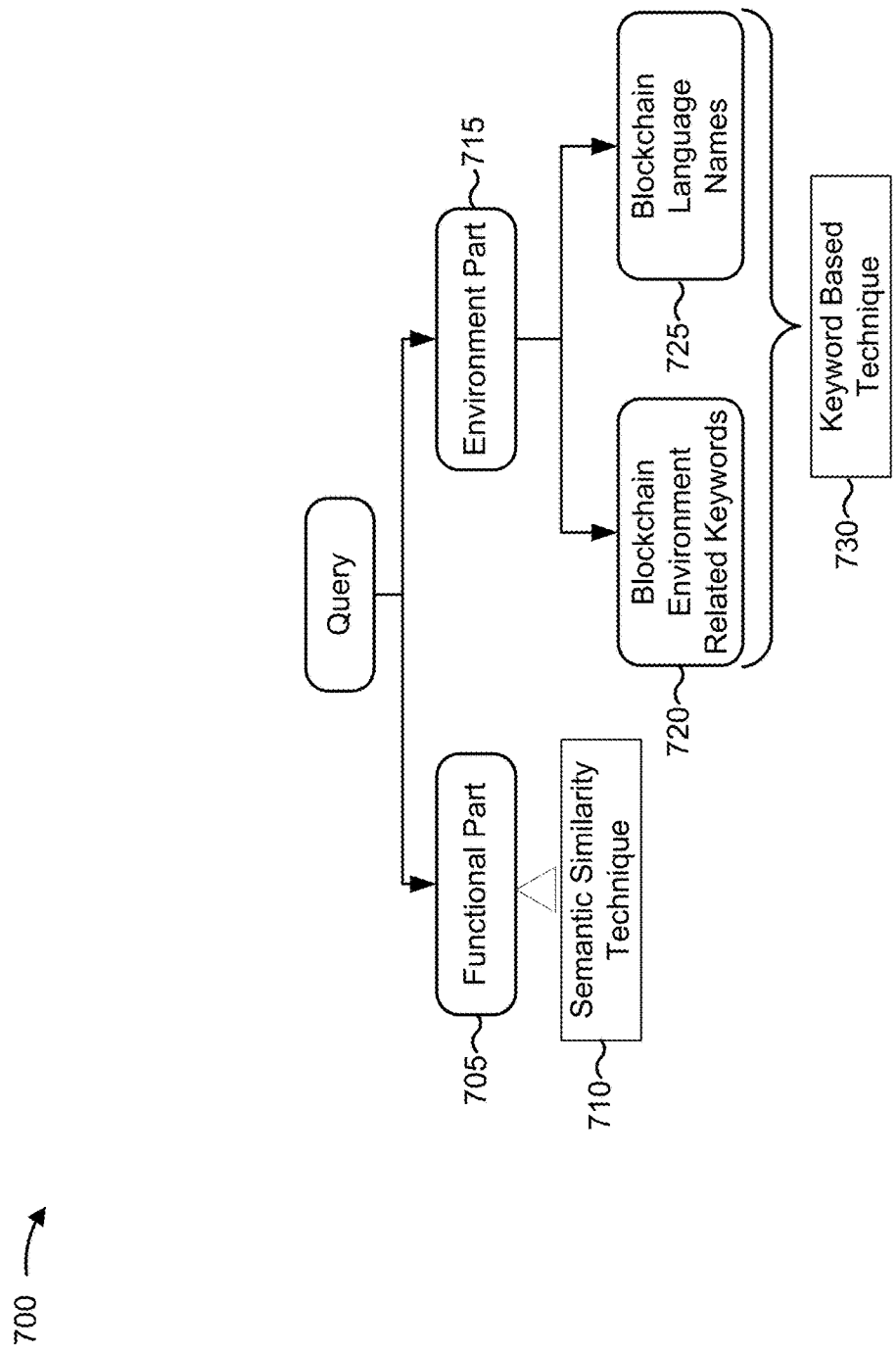

RAPID DESIGN, DEVELOPMENT, AND REUSE OF BLOCKCHAIN ENVIRONMENT AND SMART CONTRACTS

RELATED APPLICATION

This application claims priority under 35 U.S.C. § 119 to U.S. Provisional Patent Application No. 62/626,236, filed on Feb. 5, 2018, the content of which is incorporated by reference herein in its entirety.

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties.

SUMMARY

In some possible implementations, a device may include one or more memories and one or more processors, communicatively coupled to the one or more memories, to: receive a document that includes a plurality of clauses relating to two or more entities; identify a selected clause, of the plurality of clauses, based on a characteristic of the selected clause; determine a domain-specific language (DSL) unit based on the selected clause, the DSL unit identifying the two or more entities and values associated with the selected clause, identified by the selected clause, associated with the two or more entities; automatically generate a smart contract based on the DSL unit, the smart contract being configured to enforce a condition or action, of the values, between the two or more entities; and perform an action based on the smart contract.

In some possible implementations, a method may include: receiving, by a device, a document that includes a plurality of clauses relating to two or more entities; identifying, by the device, a selected clause, of the plurality of clauses, based on a characteristic of the selected clause; determining, by the device, a domain-specific language (DSL) unit based on the selected clause, the DSL unit identifying the two or more entities and a condition or action, identified by the selected clause, associated with the two or more entities; automatically generating, by the device, a smart contract based on the DSL unit, the smart contract being configured to enforce the condition or action between the two or more entities; deploying, by the device, the smart contract to a blockchain environment associated with the two or more entities; and performing, by the device, an action based on the smart contract after deploying the smart contract.

In some possible implementations, a non-transitory computer-readable medium may store one or more instructions that, when executed by one or more processors, cause the one or more processors to: receive a document that includes a plurality of clauses relating to two or more entities; identify selected clauses, of the plurality of clauses, based on characteristics of the selected clauses, a characteristic, of the characteristics, relating to whether a condition or action, of conditions or actions associated with the plurality of clauses, is performed automatically, is human-triggered, or is performed by a human; determine domain-specific language (DSL) units based on the selected clauses, a DSL unit, of the DSL units, identifying the two or more entities and a particular condition or action identified by a corresponding selected clause, the particular condition or action being associated with the two or more entities; automatically generate smart contracts based on the DSL units, a smart contract, of the smart contracts, being configured to enforce the particular condition or action between the two or more entities; and deploy the smart contracts to a blockchain environment for enforcement or performance of the particular condition or action.

BRIEF DESCRIPTION OF THE DRAWINGS

FIGS. 7A and 7B are diagrams of an example implementation for processing queries relating to the example implementation shown in FIG. 6.

DETAILED DESCRIPTION

Figure 1A:
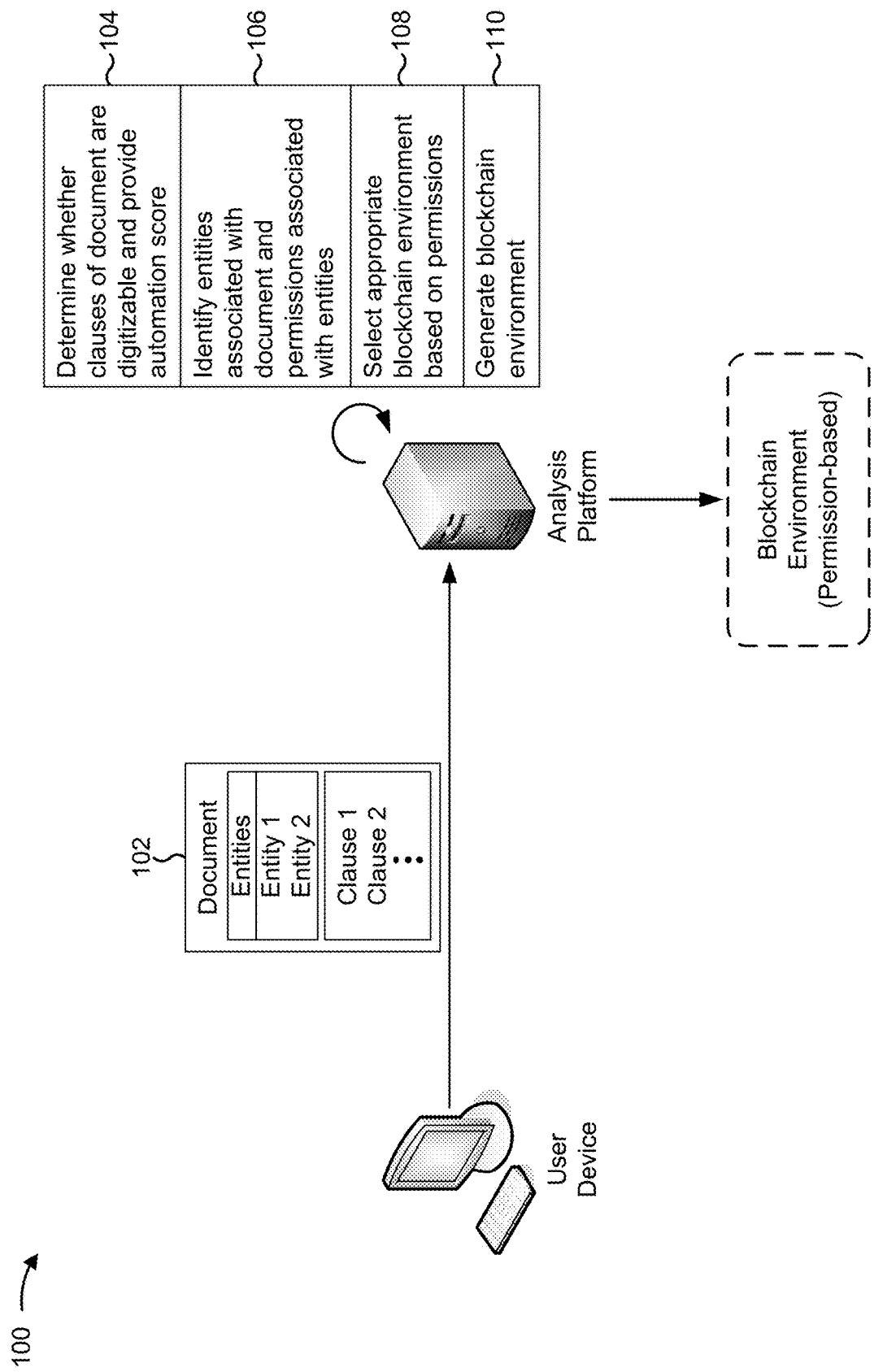
FIGS. 1A-1D are diagrams of an overview of an example implementation described herein.

The following detailed description of example implementations refers to the accompanying drawings. The same reference numbers in different drawings may identify the same or similar elements.

Two or more entities may use a contract to set out obligations between the two or more entities. For example, a contract may include conditions for performance of an obligation between a pair of entities, and may identify an action to be performed based on whether the conditions are satisfied. Traditionally, a contract is enforced based on a judicial mechanism, such as an arbitrator or a legal system.

Blockchain technology provides a mechanism for enforcement of a contractual agreement known as a smart contract. A smart contract is computer code, deployed to a blockchain, that enforces a condition between two entities based on information published to the blockchain. For example, a smart contract may determine whether the condition is satisfied and may automatically initiate a payment from one entity to another entity based on whether the condition is satisfied. The above is just one example of a smart contract capability, and other implementations are possible and contemplated herein. Thus, a smart contract may provide a digital means for enforcing the obligations of a contract.

It may be beneficial for different entities to use smart contracts for enforcement of contractual obligations. However, many difficulties arise with the use of smart contracts. For example, conventional software used to create smart contracts does not include the capability to automate the creation of a customized smart contract and instead relies on a programmer to manually create customized smart contracts. Manually creating customized smart contracts for different contractual terms may be labor-intensive and may require significant domain knowledge for a programmer who creates the smart contracts. As another example, a document used as an input for a smart contract may contain many clauses that include different conditions, actions, and relevant entities. Still further, not all clauses may be digitizable. As used herein, a clause may be deemed digitizable when a smart contract can be created automatically to enforce a condition of the clause. It may be difficult to automatically discern which contract clauses are digitizable, semi-digitizable, or likely not digitizable. Still further, it may be difficult to determine an appropriate blockchain environment for deployment of smart contracts associated with two or more entities based on permissions associated with the entities.

Some implementations described herein receive a document (e.g., a contract or another type of document) including clauses that identify conditions associated with entities. Some implementations described herein may determine, based on the document, whether the clauses are digitizable, semi-digitizable, or not digitizable. For the digitizable and/or semi-digitizable clauses, some implementations described herein may automatically identify the entities and an appropriate blockchain environment for deployment of smart contracts based on the clauses. Some implementations described herein may automatically generate smart contracts using the digitizable and/or semi-digitizable clauses using domain-specific language units that are determined based on the clauses. Furthermore, some implementations described herein may generate user agents (e.g., user interfaces) for human-triggered actions and notifications associated with the smart contracts. Still further, some implementations described herein may store the smart contracts using domain-specific keyword tagging.

In this way, some implementations described herein enable the automatic analysis of a document to generate and deploy smart contracts based on the document. This may be particularly useful in fields involving many contractual clauses, such as micro-loan distribution, trading, and/or the like. Furthermore, some implementations described herein automate a process of generating a smart contract, that was previously achieved by a human actor manually writing code for the smart contract, using a rigorous and technical approach (e.g., the selection of clauses appropriate for digitization, and the digitization of those clauses using smart contracts) that was not previously performed by a human actor. Furthermore, some implementations described herein may simplify the enforcement of contracts, particularly contracts involving the exchange of digital data, by automatically generating and deploying smart contracts based on content of the contracts. Still further, by automatically generating, deploying, and enforcing smart contracts, smart contracts and other blockchain-based enforcement methods may be used at a scale that is not possible when using human actors to generate and/or deploy smart contracts.

FIGS. 1A-1D are diagrams of an overview of an example implementation 100 described herein. As shown in FIG. 1A, and by reference number 102, an analysis platform may receive a document from a user device. The document may identify two or more entities (e.g., Entity 1 and Entity 2). Furthermore, the document may identify one or more clauses (e.g., Clause 1, Clause 2, and so on). In some implementations, the document may include a contract or a similar document. For example, the document may include any document that is associated with two or more entities and that includes clauses identifying conditions and/or actions associated with the two or more entities.

As shown by reference number 104, the analysis platform may determine whether clauses of the document are digitizable, and may provide an automation score. In some implementations, the analysis platform may determine whether to proceed with the operations described in connection with FIGS. 1A-1D based on the automation score. For example, when the automation score satisfies a threshold, the analysis platform may proceed with the operations described in FIGS. 1A-1D to automatically generate smart contracts based on the document. Additionally, or alternatively, the analysis platform may determine to proceed with the operations described herein based on a user input (e.g., based on presenting the automation score to a user). Assume that the analysis platform determines to proceed with the operations described herein.

As shown by reference number 106, the analysis platform may identify the entities associated with the document (e.g., Entity 1 and Entity 2), and may identify permissions associated with the entities. As used herein, a permission refers to information identifying a limitation or condition associated with sharing data associated with an entity. Examples of permissions include "The Borrower can see only the interest rate applicable to his account" and "The transactions related to the loan amount should be disclosed only to the Borrower and the Auditor." It may be useful to identify permissions associated with an entity and/or document so that an appropriate blockchain environment associated with smart contracts regarding the document can be selected. For example, some blockchain environments may be open blockchain environments (e.g., Ethereum) in which information is shared among all participants, whereas other blockchain environments may be permission-based (e.g., Hyperledger), wherein data is shared only among parties that have the appropriate level of permission.

Furthermore, the analysis platform may identify the entities associated with the document based on natural language processing, based on processing the document, and/or the like. In some implementations, the analysis platform may determine information associated with an entity, such as an address associated with the entity, a categorization associated with the entity (e.g., lender, debtor, guarantor, etc.), an identifier associated with the entity, and/or the like. In some implementations, the analysis platform may obtain information associated with the entities (e.g., from an external database), and may supplement or enrich information identifying the entities based on the obtained information.

In some implementations, the analysis platform may identify the entities and/or the permissions based on a document model and/or a domain model. For example, the document may be associated with a particular domain (e.g., banking, software development, law, etc.). A document associated with a particular domain may tend to include particular information in a particular format. For example, a document associated with the banking domain may identify names of a borrower and a lender, addresses associated with the borrower and lender, an identifier associated with the borrower and/or the lender, and so on. A domain model may indicate particular attributes of the domain based on which to identify the information associated with an entity and/or a clause. A document model may identify a structure of the document or expected content of the document based on which to identify the information associated with an entity and/or a clause. For example, the document model may indicate that the identifier of the borrower may be associated with a particular format and/or be in a particular location in the document. As another example, the domain model may indicate that particular types of information are to be included in the document based on a domain associated with the document. In some implementations, the domain model and/or the document model may be generated by a domain expert, a programmer, and/or the like. Additionally, or alternatively, the domain model may be generated automatically. For example, the analysis platform may enrich the domain model with information regarding the entities.

As shown by reference number 108, the analysis platform may select an appropriate blockchain environment based on the permissions. For example, the analysis platform may determine whether an open blockchain environment or a permission-based blockchain environment is appropriate based on whether the permissions indicate that data is to be shared openly or only among entities associated with particular permission levels. As shown by reference number 110, the analysis platform may generate the blockchain environment. Here, as shown, the blockchain environment is a permission-based blockchain environment. This may be because the permissions identified by the document and/or associated with the entities indicate that data is only to be shared based on permission levels associated with the entities. For example, returning to the above example of "The Borrower can see only the interest rate applicable to his account," the analysis platform may select a permission-based blockchain environment since the borrower must be prevented from viewing other interest rates.

Figure 1B:
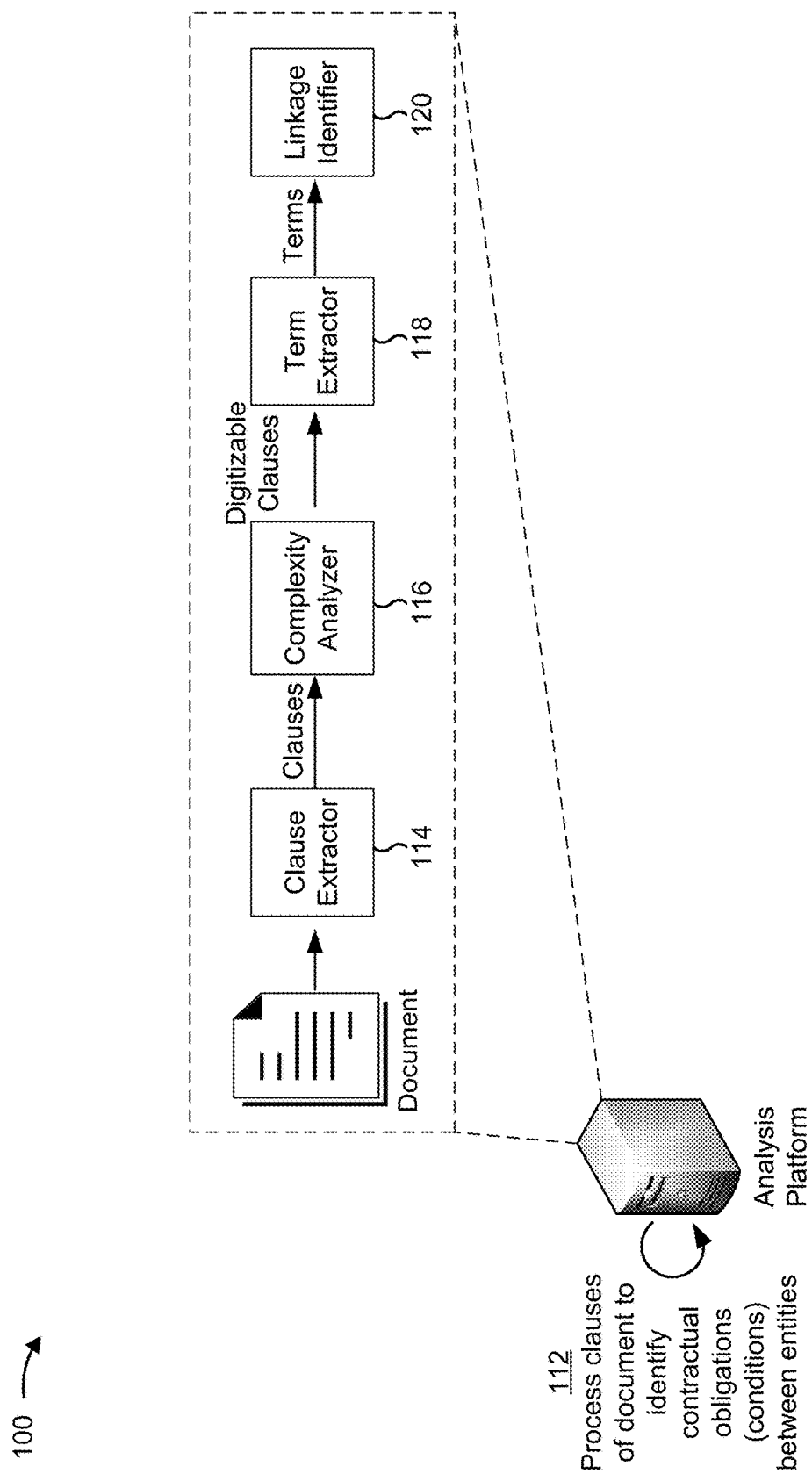

As shown in FIG. 1B, and by reference number 112, the analysis platform may process clauses of the document to identify contractual obligations between entities. As described herein, a contractual obligation may relate to an entity, an action, a subject, and/or a condition. Consider the following example of a contractual obligation: "the Borrower shall pay interest as per Schedule 1." In this case, the entity is the Borrower, the action is "pay," the subject is interest, and the condition is that the interest shall be paid as per Schedule 1. In some implementations, the analysis platform may identify the contractual obligations based on natural language processing, as described in more detail elsewhere herein.

As shown in FIG. 1B, and by reference number 114, the analysis platform may input the document to a clause extractor. The clause extractor may extract the clauses from the document. In some implementations, the clause extractor may identify the clauses based on natural language processing. In some implementations, the clause extractor may identify the clauses based on sentences of the document. For example, the clause extractor may identify a sentence, and may process the sentence to identify one or more clauses of the sentence, as described in more detail elsewhere herein.

As shown by reference number 116, the analysis platform may provide the extracted clauses to a complexity analyzer. The complexity analyzer may classify clauses as automatic, human-driven, and/or human-triggered based on conditions and/or actions of the clauses, as described in more detail elsewhere herein. The analysis platform may process the clauses based on the classifications of the clauses, as described in more detail elsewhere herein. In some implementations, the complexity analyzer (or another component of the analysis platform) may classify the clauses as digitizable, semi-digitizable, or non-digitizable, as described in more detail elsewhere herein.

As shown by reference number 118, the analysis platform may provide the digitizable clauses to a term extractor. In some implementations, the analysis platform may provide semi-digitizable clauses and/or non-digitizable clauses to the term extractor. By providing only digitizable clauses, the analysis platform conserves processing resources that would otherwise be used to attempt to digitize semi-digitizable and/or non-digitizable clauses. The term extractor may extract terms (e.g., nouns, subjects, objects, verbs, linking words, etc.) from the clauses. For example, the term extractor may identify at least one noun and/or at least one verb in each clause. In some implementations, the term extractor may extract the terms using natural language processing or a similar technique.

In some implementations, the term extractor may create data objects based on the terms. For example, the term extractor may generate a data structure that identifies a clause identifier, a noun associated with the clause identifier, a verb associated with the clause identifier, and associations between the noun, the verb, and/or between the clause and another clause. For example, the associations may be based on links included in the clause.

As shown by reference number 118, the analysis platform may provide information identifying terms of the clauses to a linkage identifier (shown by reference number 120). The linkage identifier may identify relationships between the terms of the clause (e.g., nouns, verbs, conditions, actions, etc.). For example, the linkage identifier may determine that a particular verb is associated with a particular noun, that an action is to be performed by the particular noun, that a condition is associated with a noun and/or verb, and/or the like. In some implementations, the linkage identifier may tag particular terms with particular labels.

Figure 1C:
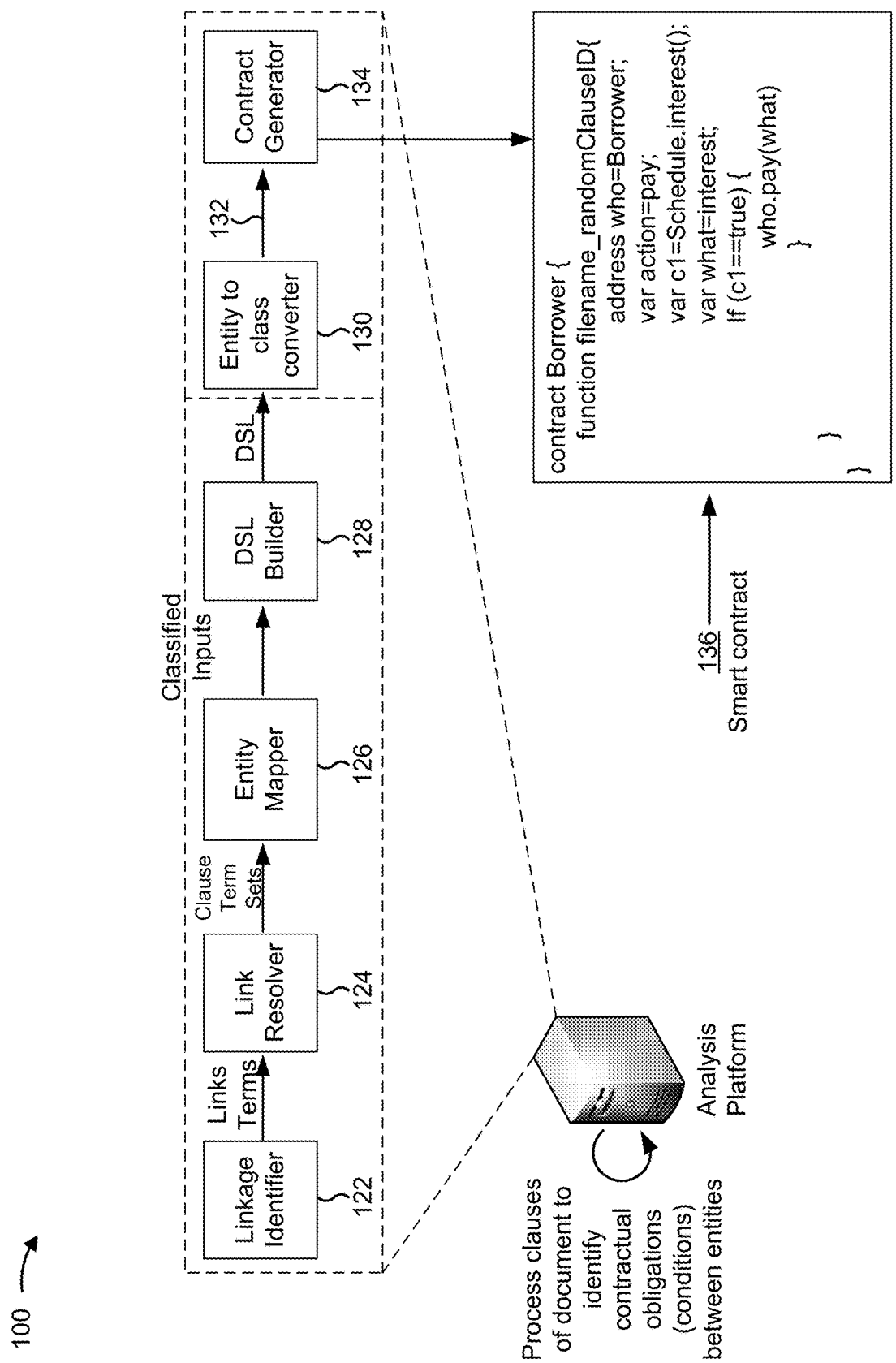

As shown in FIG. 1C, the linkage identifier (shown by reference number 122) may provide information identifying terms and links associated with the terms to a link resolver (shown by reference number 124). In some implementations, the linkage resolver (or the linkage identifier shown above) may tag a noun with a "who" label or a "what" label based on whether the noun is a subject or a direct object. As another example, the linkage resolver or the linkage identifier may tag a verb with an "action" label. As yet another example, the linkage resolver or the linkage identifier may tag a present-tense verb with a "condition" label. In some implementations, the link resolver may resolve interlinks between clauses and intralinks within a single clause. For example, the link resolver may generate a data set including variables corresponding to "who," "what," "action," and "condition" labels. The link resolver may resolve these values in the clauses, and may assign the resolved values to the variables to generate a data set that identifies "who," "what," "action," and "condition" values for each clause. In some implementations, the data set may be referred to as a clause term set. An example output of the link resolver for the clause "The Borrower shall pay the interest as per the Schedule 1" is shown below:

Name—filename_randomClauseID
Who—Borrower
Action—pay
What—interest
Conditions—Schedule.interest( )
True::Who.pay(what)

As shown by reference number 126, the analysis platform may provide the clause term sets to an entity mapper. The entity mapper may map or resolve the "who" value for each clause to an entity of the entities associated with the document. For example, the entity may match the "who" value to an entity based on comparing the "who" value to a name associated with the entity. In some implementations, the entity mapper may generate a data set that identifies the entities associated with each clause (e.g., the entity associated with the "who" value of each clause). In some implementations, such a data set may include clause structures that identify an entity associated with a clause, and that identify the values associated with the clause, as determined above. An example output clause structure of the entity mapper, continuing the above example, is shown below:

```
<entity name = "Borrower">
    <clause name="filename_randomClauseID">
    </clause>
</entity>
```

As shown by reference number 128, the analysis platform may provide the information identifying the clause structures to a domain-specific language (DSL) builder. The DSL builder may receive the clause structures, and may generate a DSL unit based on the clause structures. The DSL unit may identify each clause associated with an entity, and may identify the values associated with each clause (e.g., who, what, action, and/or condition). In some implementations, the DSL builder may generate a DSL unit for each clause. An example DSL unit, continuing the above example, is shown below:

```
<entity name="Borrower">
    <clause name="filename_randomClauseID">
        Who = Borrower
        Action = Pay
        C1=Schedule.interest( )
        What = interest
        <condition>
            IF C1 is true
            Then Who.pay(what)
        </condition>
    </clause>
</entity>
```

As shown by reference number 130, the DSL builder may provide the DSL units to an entity-to-class converter. The entity-to-class converter may receive, as input, a DSL unit, and may generate a class based on the DSL unit. The class may map the entity associated with the DSL unit to a contract, and may map the clauses associated with the entity to functions. An example output of the entity-to-class converter, continuing the above example, is shown below:

```
contract Borrower {
    function filename_randomClauseID {
        var Who = Borrower
        var Action = Pay
            var C1=Schedule.interest( )
            var What = interest
            If (C1 is true) {
                Who.pay(What)
            }
        }
    }
}
```

As shown by reference number 132, the analysis platform may provide the classes, based on the clauses and the entities, to a contract generator (shown by reference number 134). The contract generator may generate a smart contract (shown by reference number 136) based on the classes. In some implementations, the contract generator may generate the contract based on a target language. For example, the contract generator may determine a target language (e.g., based on the blockchain environment, based on a configuration of the contract generator, based on a user input, etc.), and may generate a smart contract in the target language based on a target language grammar model associated with the target language. For example, if the smart contract is to be deployed in an Ethereum blockchain environment, the contract generator may determine the smart contract using an Ethereum grammar model.

Figure 1D:
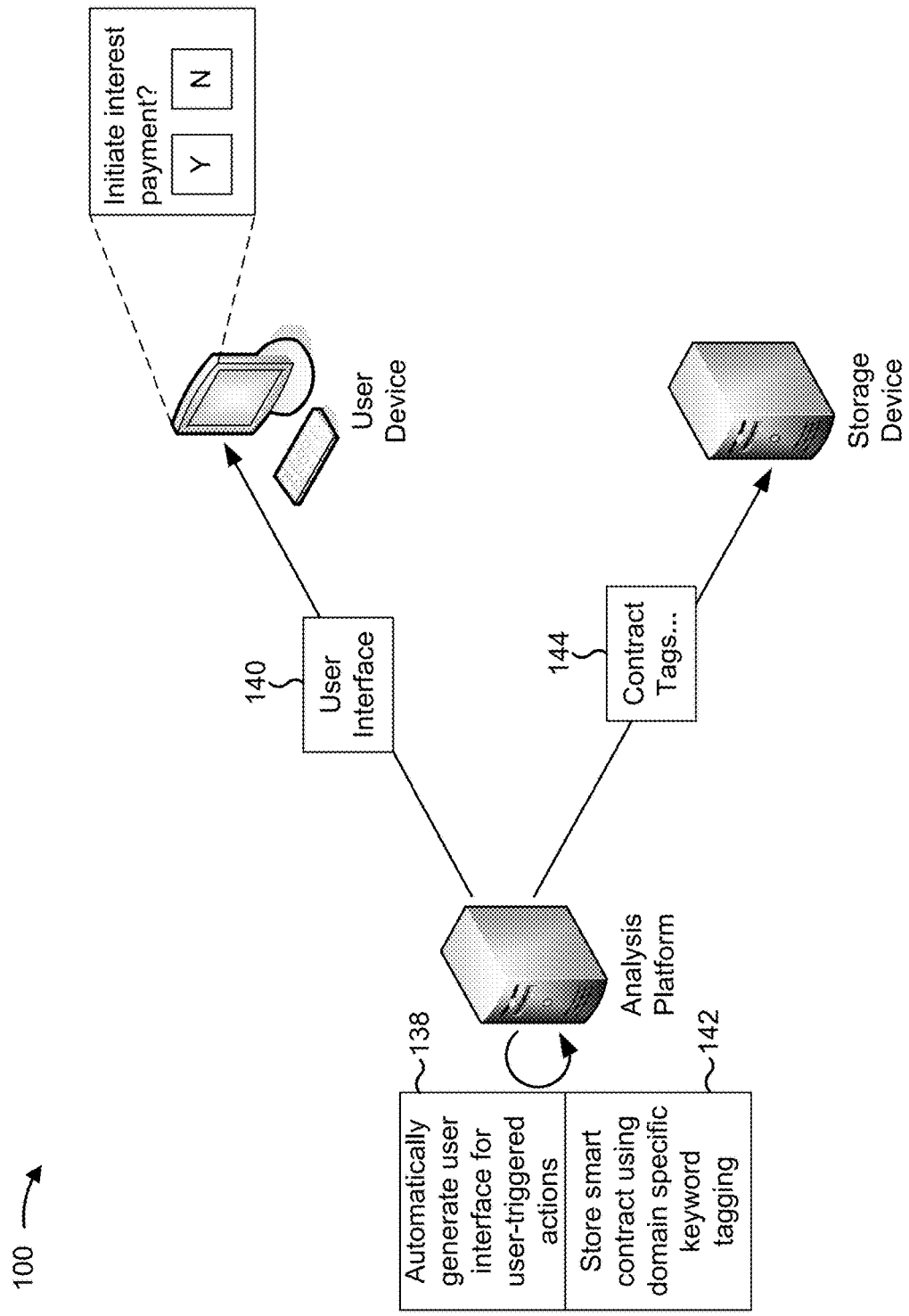

As shown in FIG. 1D, and by reference number 138, the analysis platform may automatically generate a user interface for a user-triggered action. For example, some actions may be associated with manual input to trigger or initiate such an action. As shown by reference number 140, the analysis platform may provide the user interface for a user device, so that a user can provide the manual input. In this way, the analysis platform may provide for enforcement of smart contracts that involve a human-triggered action.

As shown by reference number 142, the analysis platform may store the smart contracts using domain-specific keyword tagging, as described in more detail elsewhere herein. For example, the analysis platform may provide the smart contracts and the tags associated with the smart contracts to a storage device. In some implementations, the analysis platform or another device may process queries, and may identify one or more pertinent smart contracts based on the queries, as described in more detail elsewhere herein. As shown by reference number 144, in some implementations, the analysis platform may provide the smart contracts and the tags for storage.

In this way, some implementations described herein enable the automatic analysis of a document to generate and deploy smart contracts based on the document. This may be particularly useful in fields involving many contractual clauses, such as micro-loan distribution, trading, and/or the like. Furthermore, some implementations described herein automate a process using a rigorous and technical approach (e.g., the selection of clauses appropriate for digitization, and the digitization of those clauses using smart contracts). Furthermore, some implementations described herein may simplify the enforcement of contracts, particularly contracts involving the exchange of digital data, by automatically generating and deploying smart contracts based on content of the contracts.

As indicated above, FIGS. 1A-1D are provided merely as an example. Other examples are possible and may differ from what was described with regard FIGS. 1A-1D.

Figure 2:
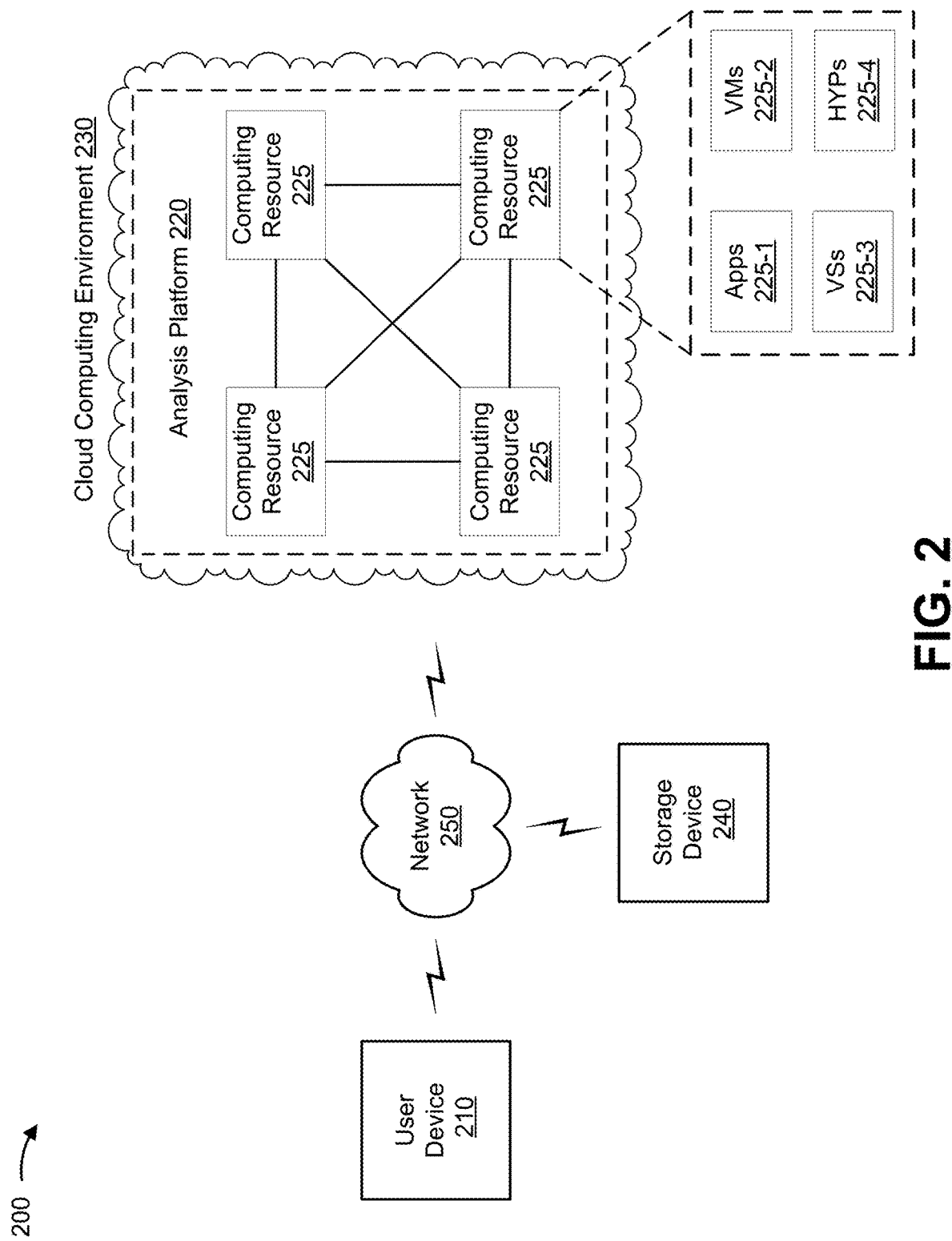
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an analysis platform 220, computing resources 225, a cloud computing environment 230, a storage device 240, and a network 250. Devices of environment 200 may interconnect via wired connections, wireless connections, or a combination of wired and wireless connections.

User device 210 includes one or more devices capable of receiving, generating, storing, processing, and/or providing information associated with a document of clauses associated with two or more entities. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Analysis platform 220 includes one or more devices capable of receiving, generating, storing, processing, and/or providing information associated with generating smart contracts based on a document. For example, analysis platform 220 may include a server, a group of servers, and/or the like. In some implementations, analysis platform 220 may be partially or entirely implemented in cloud computing environment 230.

Cloud computing environment 230 includes an environment that delivers computing as a service, whereby shared resources, services, etc. may be provided to analysis platform 220. Cloud computing environment 230 may provide computation, software, data access, storage, and/or other services that do not require end-user knowledge of a physical location and configuration of a system and/or a device that delivers the services.

Computing resource 225 includes one or more personal computers, workstation computers, server devices, or another type of computation and/or communication device. In some implementations, computing resource 225 may host analysis platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 210. Application 225-1 may eliminate a need to install and execute the software applications on user device 210. For example, application 225-1 may include software associated with analysis platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., user device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Storage device 240 includes a device capable of receiving, storing, and providing information. For example, storage device 240 may include a server or a group of servers. In some implementations, storage device 240 may be partially or entirely implemented in cloud computing environment 230.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
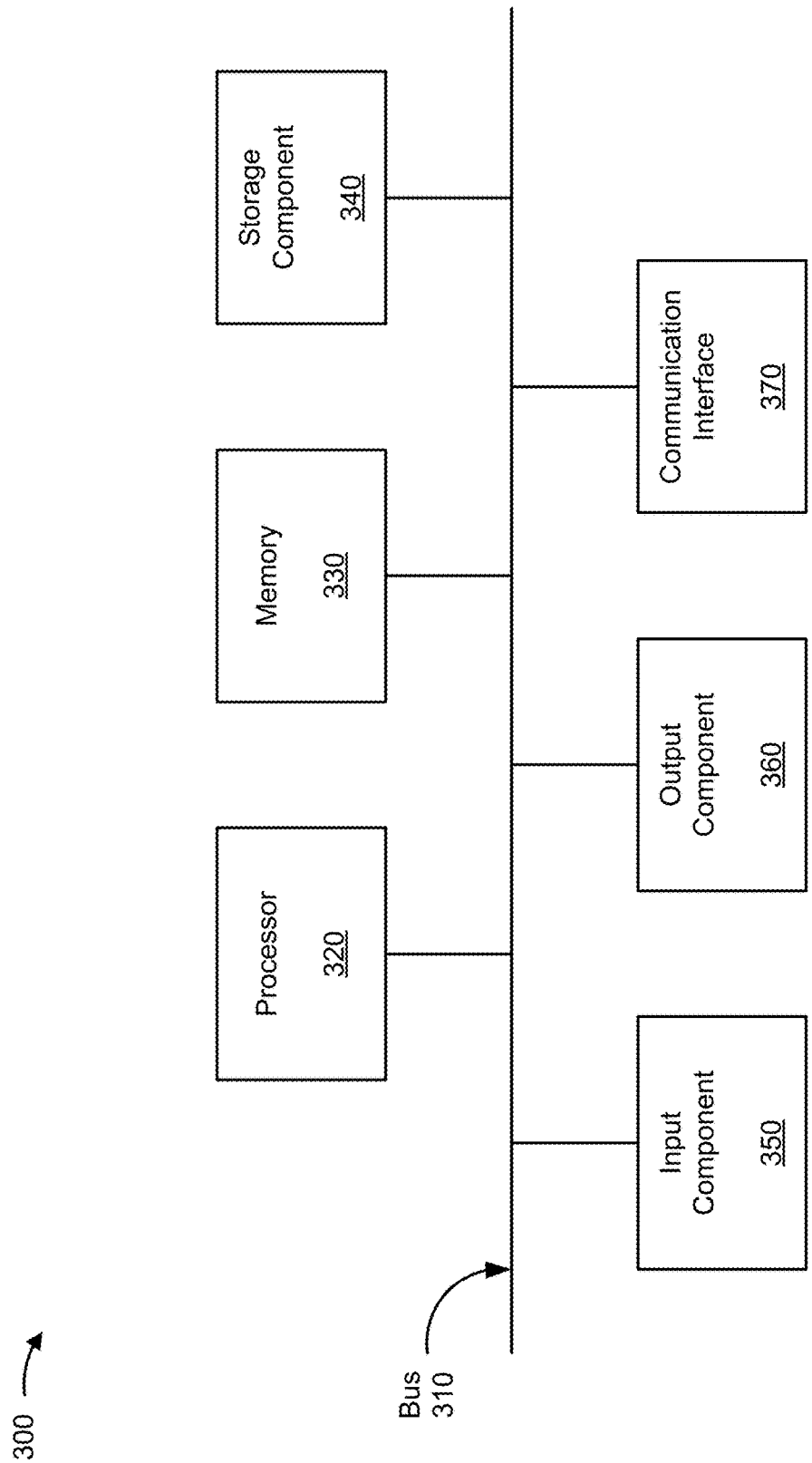
FIG. 3 is a diagram of example components of one or more devices of FIG. 2.

FIG. 3 is a diagram of example components of a device 300. Device 300 may correspond to user device 210, computing resource 225, and storage device 240. In some implementations, user device 210, computing resource 225, and/or storage device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes one or more memories, such as a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
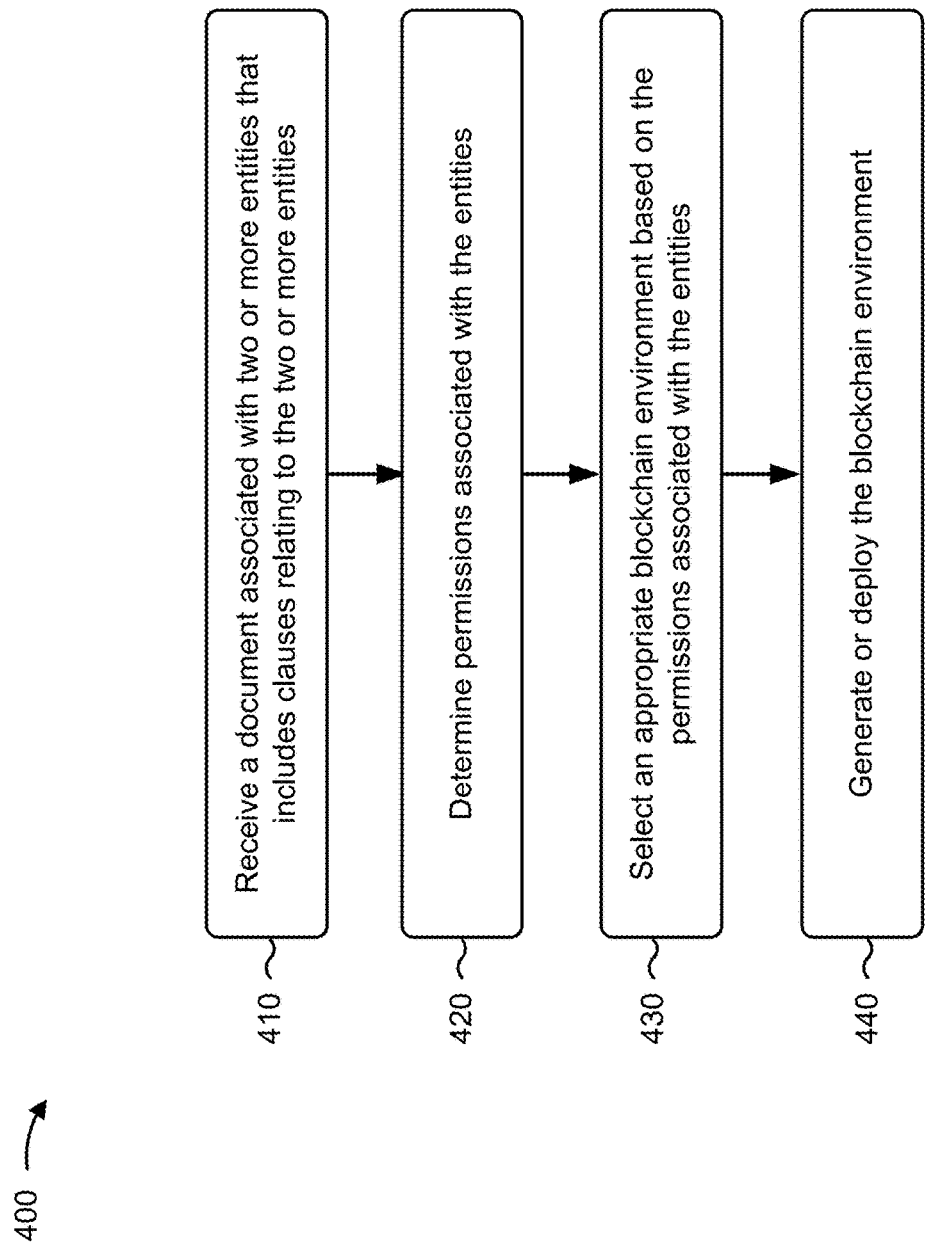
FIG. 4 is a flow chart of an example process for deploying a blockchain environment based on a document associated with two or more entities.

FIG. 4 is a flow chart of an example process 400 for deploying a blockchain environment based on a document associated with two or more entities. In some implementations, one or more process blocks of FIG. 4 may be performed by analysis platform 220. In some implementations, one or more process blocks of FIG. 4 may be performed by another device or a group of devices separate from or including analysis platform 220, such as user device 210 and storage device 240.

As shown in FIG. 4, process 400 may include receiving a document associated with two or more entities that includes clauses relating to the two or more entities (block 410). For example, analysis platform 220 (e.g., using computing resource 225, processor 320, memory 330, storage component 340, communication interface 370, and/or the like) may receive a document. In some implementations, analysis platform 220 may receive the document from user device 210. The document may include clauses relating to two or more entities. Each clause may be associated with a contractual obligation between the two or more entities.

Processes 400 and 500 are described with reference to a single document. However, this is solely for ease of explanation. In practice, analysis platform 220 may operate on thousands of documents, millions of documents, or billions of documents for tons of contracts, and even for a single contract, analysis platform 220 might operate upon two or more documents. In this way, analysis platform 220 automatically processes volumes of documents that would be difficult or impossible for human actors to process, thereby improving the generation of smart contracts based on these documents and streamlining the selection of smart contracts for contractual obligations. Furthermore, any conservation of processing resources during the process described herein may be multiplied (e.g., by thousands, millions, billions, etc.) when the implementations described herein are practiced in reality.

As further shown in FIG. 4, process 400 may include determining permissions associated with the entities (block 420). For example, analysis platform 220 (e.g., using computing resource 225, processor 320, memory 330, storage component 340, communication interface 370, and/or the like) may determine permissions associated with the entities. In some implementations, analysis platform 220 may determine the permissions based on an analysis of the document. For example, analysis platform 220 may determine particular language in the document (e.g., using natural language processing and/or a similar technique) that indicates the permissions. In some implementations, analysis platform 220 may determine the permissions based on information extrinsic to the documents. For example, analysis platform 220 may store or obtain information identifying the permissions (e.g., from an information source external to analysis platform 220). In some implementations, a permission may indicate that data may be shared openly between entities. In some implementations, a permission may indicate that data may only be shared between entities associated with particular permission levels.

As further shown in FIG. 4, process 400 may include selecting an appropriate blockchain environment based on the permissions associated with the entities (block 430). For example, different blockchain environments may be associated with different sharing configurations. An open blockchain environment, such as Ethereum, may share data between all entities that can access the open blockchain environment. A permission-based blockchain environment, such as Hyperledger, may allow for selective assignment of permission levels for entities, so that data access by the entities can be controlled. Analysis platform 220 (e.g., using computing resource 225, processor 320, memory 330, storage component 340, communication interface 370, and/or the like) may determine an appropriate blockchain environment based on the permissions. For example, when the permissions indicate a blockchain-related restriction, analysis platform 220 may determine that a permission-based blockchain environment is to be used.

As further shown in FIG. 4, process 400 may include generating or deploying the blockchain environment (block 440). For example, analysis platform 220 (e.g., using computing resource 225, processor 320, memory 330, storage component 340, communication interface 370, and/or the like) may generate the blockchain environment. In some implementations, analysis platform 220 may provide information identifying the blockchain environment for another party (e.g., an administrator, an entity, etc.) to generate the blockchain environment. In some implementations, analysis platform 220 may generate the blockchain environment based on the permissions. For example, in a permission-based blockchain environment, analysis platform 220 may configure particular permissions associated with corresponding entities, and may generate the blockchain environment to enforce the particular permission with regard to the corresponding entities. In this way, analysis platform 220 may reduce time and organizational resources associated with deploying a blockchain environment by automatically determining and deploying a suitable blockchain environment for a document. Furthermore, by identifying an appropriate blockchain environment, analysis platform 220 improves data security for entities of the blockchain environment. Still further, by automatically deploying blockchain environments, analysis platform 220 automates a process that would be difficult or impossible for a human actor to perform at sufficient volume to keep pace with the increasing volume of smart contract-based documents.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
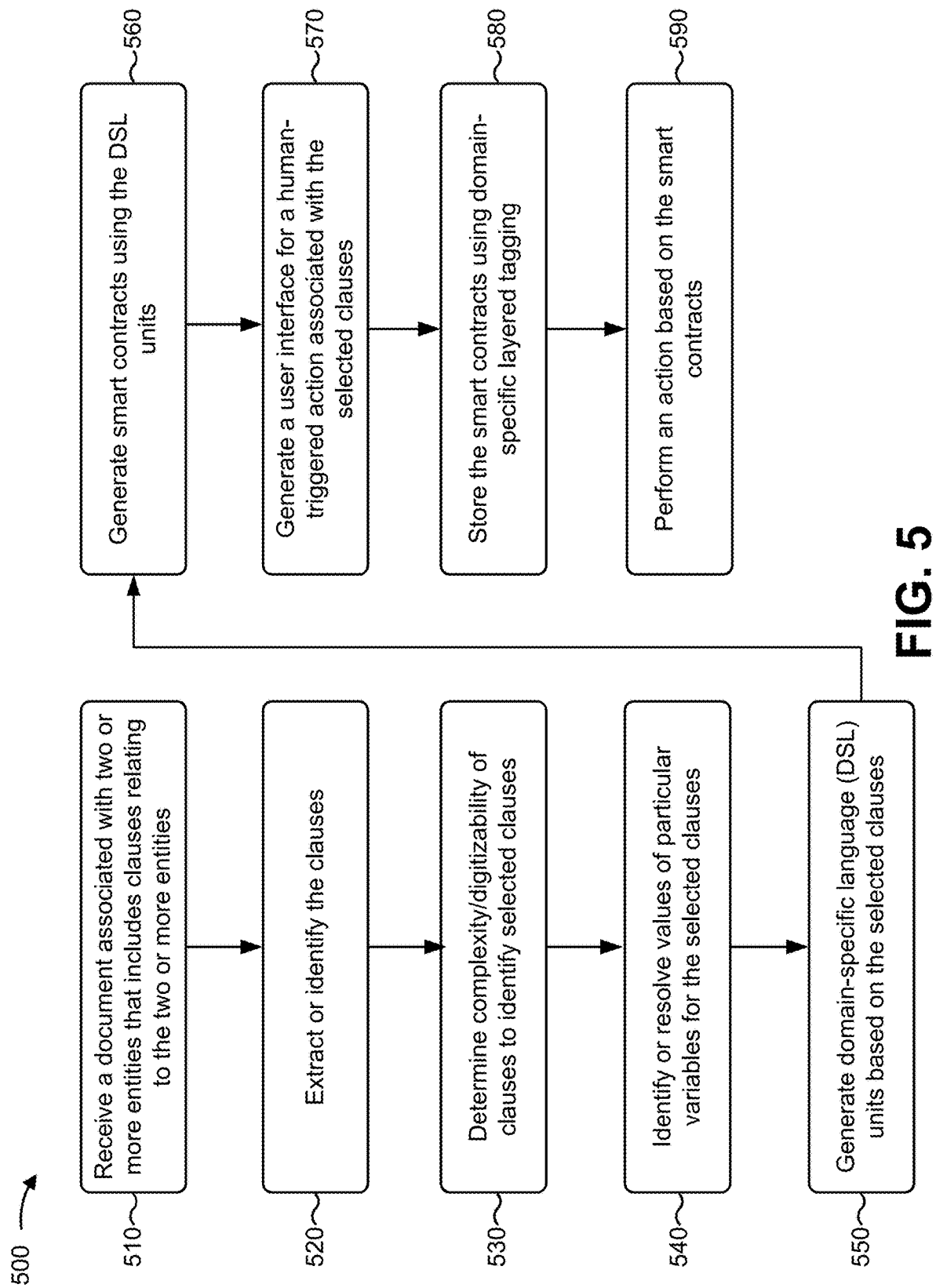
FIG. 5 is a flow chart of an example process for generating smart contracts based on a document associated with two or more entities.

FIG. 5 is a flow chart of an example process 500 for generating smart contracts based on a document associated with two or more entities. In some implementations, one or more process blocks of FIG. 5 may be performed by analysis platform 220. In some implementations, one or more process blocks of FIG. 5 may be performed by another device or a group of devices separate from or including analysis platform 220, such as user device 210 and storage device 240.

As shown in FIG. 5, process 500 may include receiving a document associated with two or more entities that includes clauses relating to the two or more entities (block 510). For example, analysis platform 220 (e.g., using computing resource 225, processor 320, memory 330, storage component 340, communication interface 370, and/or the like) may receive a document, as described in more detail herein.

In some implementations, analysis platform 220 may determine whether the document is amenable for automation or determination of smart contracts. For example, analysis platform 220 may determine an automation score for the document. The automation score may be based on whether clauses of the document are digitizable (e.g., capable of being converted into a smart contract that automatically enforces an action and/or condition and/or is automatically verifiable), semi-digitizable (e.g., capable of being converted into a smart contract that enforces a human-triggered action or condition and/or is automatically verifiable or human-verifiable), or non-digitizable (e.g., incapable of being converted into a smart contract due to being unverifiable). In some implementations, analysis platform 220 may determine the automation score based on a ratio of digitizable, semi-digitizable, and/or non-digitizable clauses. In some implementations, analysis platform 220 may determine whether to proceed with process 500 based on the automation score. For example, when the automation score satisfies a threshold, analysis platform 220 may proceed with process 500. When the automation score does not satisfy a threshold, analysis platform 220 may not proceed with process 500. In such a case, analysis platform 220 may perform another action, such as notifying an administrator and/or the like. In this way, analysis platform 220 conserves computing resources by not processing documents that are not likely to result in a usable smart contract.

As further shown in FIG. 5, process 500 may include extracting or identifying the clauses (block 520). For example, analysis platform 220 (e.g., using computing resource 225, processor 320, memory 330, storage component 340, communication interface 370, and/or the like) may extract or identify the clauses. In some implementations, analysis platform 220 may extract or identify the clauses in the document using a natural language processing technique or a similar technique. In some implementations, analysis platform 220 may use an algorithm to extract clauses from the document. A description of one example of such an algorithm follows, although other algorithms are also possible and may be used to extract the clauses.

1. Receive an input clause from the document
2. Convert a sentence of the clause into simple form by identifying the presence of connection words as follows:
    a. If the given clause contains connections such as "after|although|as|because|before|even though|if|since|though|unless|until|when|whenever|whereas-|wherever|while", then the given clause is a Complex Sentence; go to Step 3
    b. If the given clause contains connections such as "For|And|Nor|But|Or|Yet|So", then the given clause is a Compound Sentence; go to Step 4
    c. If the given clause is a Simple Sentence; go to Step 5
3. Chunk the sentence at a connection point identified by the connection and do the following:
    a. If chunk sentence contains conditions, associate the chunk sentence with the previous chunk
    b. The chunk sentence should have at least one Noun and Verb associated with the chunk sentence.
    c. Upon successful chunk of the Complex Sentence into a set of sentences, go to Step 4
4. Chunk the sentence at a connection point identified by the connection and do the following:
    a. Chunk sentence should have at least one Noun and Verb associated with the chunk sentence.
    b. Upon successful chunk of the Compound Sentence into a set of sentences, go to Step 5
5. Extract each sentence from the set of sentences, and perform clause classification
    a. Parse the sentence using a parser (e.g., Stanford Natural Language Processing (NLP) parser), and extract the Nouns and Verbs
    b. If the sentence contains verbs (e.g., labeled VBZ or VBN using Stanford NLP parser)—Tag the sentence as a Non-verifiable sentence c. Identify Modal Verbs, such as "must, shall, will, should, would, can, could, may, and might"
   i. If the sentence contains Modal Verbs—tag the sentence as a Human-driven sentence
d. If both 5(b) and 5(c) conditions are true—tag the sentence as a Human-Verifiable & Human-driven sentence
e. If both Verb (VB) and Noun (NNP) are present, the sentence is a proper simple sentence—tag the sentence as an Automatic sentence
6. From the classified sentence, extract the Noun, Verb, and Associations
7. Form a set that is represented as follows: {ClauseID, Noun, Verb, Associations}

As further shown in FIG. 5, process 500 may include determining complexity/digitizability of clauses to identify selected clauses (block 530). For example, analysis platform 220 (e.g., using computing resource 225, processor 320, memory 330, storage component 340, communication interface 370, and/or the like) may determine a complexity or a digitizability of the clauses. In some implementations, analysis platform 220 may determine whether each clause of the clauses is digitizable, semi-digitizable, or non-digitizable, as described in more detail elsewhere herein. Analysis platform 220 may determine the complexity or digitizability of the clauses to determine selected clauses for which to generate smart contracts based on characteristics of the selected clauses. For example, the selected clauses may be clauses that are digitizable and/or semi-digitizable. In some implementations, analysis platform 220 may determine whether clauses are to be digitized based on respective scores associated with the clauses. For example, the respective scores may be based on variables included in the clauses and/or the like. By identifying selected clauses based on digitizability of the selected clauses, analysis platform 220 improves accuracy of generation of smart contracts based on the selected clauses and conserves processor resources that would otherwise be used to attempt to digitize non-digitizable clauses.

In some implementations, analysis platform 220 may not determine selected clauses. For example, analysis platform 220 may determine to digitize all clauses of the document. This may occur, for example, when analysis platform 220 has determined that an automation score of the document satisfies a particular threshold.

As further shown in FIG. 5, process 500 may include identifying or resolving values of particular variables for the selected clauses (block 540). For example, analysis platform 220 (e.g., using computing resource 225, processor 320, memory 330, storage component 340, communication interface 370, and/or the like) may use the sets of clause identifiers, nouns, verbs, and associations identified in connection with block 520 to identify or resolve values of particular variables for the selected clauses. In some implementations, the particular variables may include, for example, a "who" variable, a "what" variable, a "condition" variable, an "action" variable, and/or the like. Each clause may include at least one value of at least one of the particular variables. In some implementations, analysis platform 220 may identify or resolve the values of the particular variables based on natural language processing. For example, analysis platform 220 may perform an algorithm such as the algorithm described below to identify or resolve the values of the particular variables:

1. Take input set of words and associations (e.g., output set of block 520)
2. From the given words and associations, extract the following values:
   a. Extract the Nouns (NNP (proper noun, singular))—Tag as Who value of the given sentence
   b. Extract the Nouns (VB (verb, base form))—Tag as Action value of the given sentence
   c. Extract the Nouns (dobj (direct object))—Tag as What value of the given sentence
   d. Extract the Nouns (VBP (verb, non-third person singular present))≤Tag as Condition value of the given sentence
3. Once the four values are identified from the given sentence, resolve the interlinks and intralinks of the values
   a. Map Name from the given clause ID
   b. Create Who variable and resolve Who value from an Entity Repository (e.g., identifying entities associated with the document or associated with analysis platform 220), and assign the Who value to the Who variable.
   c. Create Action variable, resolve Action value from the given sentence, and assign the Action value to the Action variable
   d. Resolve Conditions as follows:
      i. The verb (VBP) may represent the condition value
      ii. Create What variable, resolve What value from the given sentence, and assign to the What variable as follows:
         1. The associated Noun (NN (noun, singular or mass)) represents the action on the condition object
   e. Generate True Block for the above condition as follows:
      i. True::Who.Action(What);
      ii. Resolve Who, Action, and What from the above step 3(a)
4. Determine a set (e.g., a classified input or a processed clause) based on the above-generated variables.

Of course, other algorithms for resolving variable values with regard to the clauses may be used and are contemplated, and the above algorithm is provided as an example only.

As further shown in FIG. 5, process 500 may include generating domain-specific language (DSL) units based on the selected clauses (block 550). For example, analysis platform 220 (e.g., using computing resource 225, processor 320, memory 330, storage component 340, communication interface 370, and/or the like) may generate DSL units based on the classified inputs generated in connection with block 540, above. In some implementations, a DSL unit may identify an entity (e.g., an entity associated with a "who" variable for a particular classified input), and may identify each clause associated with the entity. For example, if the entity is associated with a "who" variable in three different clauses, the DSL unit may identify the entity, the three clauses, and the variable values associated with the three clauses. This may conserve storage and processing resources in comparison to determining separate DSL units for each clause. In some implementations, a DSL unit may correspond to a single clause.

In some implementations, analysis platform 220 may determine the DSL units by resolving an entity associated with a classified input. Analysis platform 220 may generate a structure identifying the entity, a clause associated with the classified input, and variable values of the clause. For each clause associated with the entity (e.g., as a "who" value), analysis platform 220 may add, to the structure, information identifying each clause and variable values of each clause. Analysis platform 220 may use the structure to generate a DSL unit that identifies the entity, the variable values associated with the entity, and the conditions associated with each clause associated with the entity (e.g., based on the variable values associated with each clause). In this way, analysis platform 220 generates a DSL unit that identifies each clause associated with the entity, and that identifies the particular condition associated with each clause. This, in turn, improves efficiency of generating the corresponding smart contracts by using a standardized data format to generate the smart contracts, by reducing processor usage and time associated with handling unexpected formatting of information for generating the smart contracts.

As further shown in FIG. 5, process 500 may include generating smart contracts using the DSL units (block 560). For example, analysis platform 220 (e.g., using computing resource 225, processor 320, memory 330, storage component 340, communication interface 370, and/or the like) may use the DSL units generated in connection with block 550 to generate smart contracts. In some implementations, analysis platform 220 may generate a smart contract based on a particular target language. For example, analysis platform 220 may generate a blockchain environment, and may generate the smart contract in a target language associated with the blockchain environment.

In some implementations, analysis platform 220 may generate a class based on the DSL unit. For example, the class may identify the entity, the variable values, and the condition, and may be in a format that allows efficient generation of smart contracts in different target languages. By generating the class based on the DSL unit, analysis platform 220 may improve efficiency of generating smart contracts in different target languages. Furthermore, the use of classes may provide the generation of a smart contract in a second target language after generating the smart contract in a first target language. Thus, smart contracts based on a particular clause may be efficiently generated in a variety of languages, thereby conserving processor resources that would otherwise be used to perform the entire digitization procedure for the particular clause for each language in which the smart contract is to be generated.

As further shown in FIG. 5, process 500 may include generating a user interface for a human-triggered action associated with the selected clauses (block 570). For example, some actions associated with the selected clauses (or the clauses for which the smart contracts are generated) may be human-triggered actions. A human-triggered action may include any action for which a human is to trigger performance of the action. Such an action may include, for example, approving a loan, disbursing a loan, notifying an attorney, and/or the like. Analysis platform 220 (e.g., using computing resource 225, processor 320, memory 330, storage component 340, communication interface 370, and/or the like) may automatically generate a user interface for a clause to receive an interaction to trigger an action of the clause. For example, analysis platform 220 may receive a DSL unit describing the clause, may identify a target language for the user interface (e.g., iOS, Android, Windows, Linux, MacOS, etc.), may determine a grammar associated with the target language, and may generate components of the user interface according to the grammar. For an example of a user interface that may be generated, and the components that may be generated to provide the user interface, refer to the appendix. By automatically generating a user interface, analysis platform 220 reduces reliance on inefficient and subjective processes, such as human-based generation of user interfaces. Furthermore, using a standardized technique for generating the user interfaces may increase reliability of the user interfaces, thereby reducing errors in generation and implementation of the user interfaces.

As further shown in FIG. 5, process 500 may include storing the smart contracts using domain-specific layered tagging (block 580). For example, analysis platform 220 (e.g., using computing resource 225, processor 320, memory 330, storage component 340, communication interface 370, and/or the like) may store the smart contracts. In some implementations, analysis platform 220 may store DSL units associated with the smart contracts. In some implementations, analysis platform 220 may assign tags to the smart contracts and/or the DSL units, as described in more detail in connection with FIG. 6, below. In some implementations, analysis platform 220 may store information associated with the smart contracts and/or the DSL units. For example, analysis platform 220 may store information identifying a blockchain environment and/or a target language associated with a smart contract. In some implementations, analysis platform 220 may process a search query to identify appropriate smart contracts and/or DSL units based on the search query, as described in more detail in connection with FIGS. 7A and 7B, below. By storing and tagging smart contracts and/or DSL units, analysis platform 220 may provide for efficient identification of existing smart contracts, thereby conserving processor resources that would otherwise be used to generate a new smart contract based on a clause.

In some implementations, analysis platform 220 may perform layered tagging of the smart contracts. For example, analysis platform 220 may determine multiple, different data layers for tags regarding the smart contracts. Examples of layers may include a blockchain environment layer, an entity layer, a domain layer, and so on. A search query to identify an appropriate smart contract may identify different layers in which to search for tags associated with the appropriate smart contract. For example, the query may identify a blockchain environment, an entity associated with the smart contract, and a domain associated with the smart contract (e.g., "Ethereum smart contract for micro-lending by Bank A"). By using layered tagging, efficiency of searching for relevant smart contracts may be improved, thereby conserving processor resources that would otherwise be used to search for smart contracts in a less efficient fashion, or to generate a new smart contract when an appropriate smart contract cannot be efficiently identified using the search query.

As further shown in FIG. 5, process 500 may include performing an action based on the smart contracts (block 590). For example, analysis platform 220 (e.g., using computing resource 225, processor 320, memory 330, storage component 340, communication interface 370, and/or the like) may deploy the smart contracts to a blockchain environment, such as a blockchain environment generated by analysis platform 220. In some implementations, analysis platform 220 may automatically deploy a user interface to a user device 210 associated with a user who is to provide input for a user-triggered action. In some implementations, analysis platform 220 may provide the smart contract to at least one entity identified by the smart contract, such as an entity associated with a "who" variable of the smart contract.

In some implementations, analysis platform 220 may provide a smart contract and/or a user interface for review. For example, analysis platform 220 may provide the smart contract and/or user interface for review by a programmer. In some implementations, analysis platform 220 may provide a smart contract and/or user interface based on an expertise of the programmer. For example, when the smart contract is associated with a particular target language or domain, analysis platform 220 may determine to provide the smart contract to a programmer familiar with the particular target language or domain. In this way, analysis platform 220 may improve efficiency of reviewing the smart contract by selecting a particular programmer to which to provide the smart contract for review.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
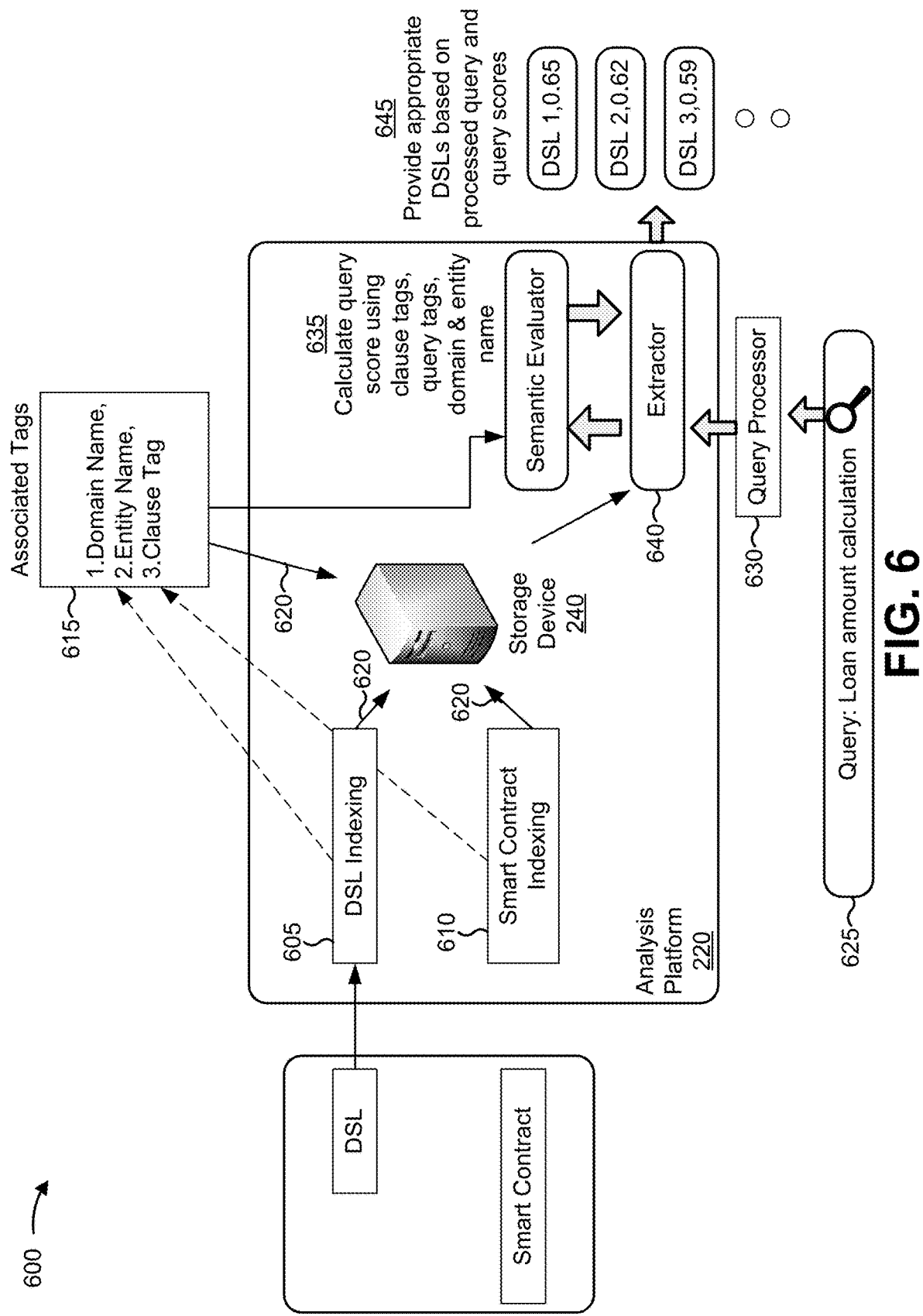
FIG. 6 is a diagram of an example implementation for domain-based smart tagging of smart contracts.

FIG. 6 is a diagram of an example 600 of domain-based smart tagging of smart contracts and processing a query based on the smart tagging. As shown in FIG. 6, and by reference number 605, analysis platform 220 may perform DSL indexing of DSL units. As shown by reference number 610, analysis platform 220 may perform smart contract indexing of smart contracts. For example, analysis platform 220 may tag DSL units and/or smart contracts with various tags based on the DSL units, the smart contracts, and/or information associated with the DSL units and/or smart contracts. As shown by reference number 615, possible tags may include a domain name (e.g., banking, law, software development, etc.), an entity name (e.g., associated with a "who" variable or a "what" variable of a DSL unit or a smart contract), a clause tag (e.g., identifying one or more variable values of a clause of the DSL), and/or other values. As shown by reference number 620, analysis platform 220 may store (e.g., provide to storage device 240 for storage) the DSL units, the smart contracts, and the tags.

As shown by reference number 625, analysis platform 220 may receive a query. Here, the query includes a string "Loan amount calculation." As shown by reference number 630, analysis platform 220 may process the query (e.g., using a query processor). For example, the query processor may identify elements of the query, and may provide the elements of the query to a semantic evaluator and/or a discrepancy evaluator, as described in more detail in connection with FIG. 7B. In some implementations, the query processor may format the query, may sanitize the query, and/or the like, to generate a processed query.

As shown by reference number 635, analysis platform 220 may determine a query score for the processed query. In some implementations, the query score may be based on a semantic score. For example, analysis platform 220 may determine a score based on a semantic similarity of the elements of the query and tags associated with particular DSL units or smart contracts. Here, analysis platform 220 determines the score based on clause tags, query tags, domain tags, and entity names of the query (if elements corresponding to the above tags are included in the query).

As shown by reference number 640, an extractor may extract DSL units or smart contracts, associated with particular scores, from storage (e.g., from storage device 240). For example, the extractor may extract DSL units associated with a highest X scores, where X is an integer. As shown by reference number 645, analysis platform 220 may provide appropriate DSL units based on the processed query and based on the query scores. For example, and as shown, analysis platform 220 may provide the DSL units associated with the highest X scores. In some implementations, analysis platform 220 may provide smart contracts associated with the DSL units. For example, when the smart contract matches a blockchain environment associated with the query, analysis platform 220 may provide the smart contract, thereby conserving processor resources that would otherwise be used to generate the smart contract based on the corresponding DSL unit. When the smart contract does not match the blockchain environment associated with the query, analysis platform 220 may provide the DSL unit so that a recipient of the DSL unit can generate the smart contract for the appropriate blockchain environment.

In this way, analysis platform 220 identifies a relevant DSL and/or smart contract based on a query and based on layered tagging of the relevant DSL and/or smart contract. Thus, processor resources are conserved that would otherwise be used to generate a smart contract from scratch when one might otherwise be identified based on the query. Furthermore, organizational time and processing resources might be saved that would otherwise be used to manually search for an appropriate smart contract and/or by using a less efficient tagging technique.

As indicated above, FIG. 6 is provided merely as an example. Other examples are possible and may differ from what was described with regard to FIG. 6.

Figure 7B:
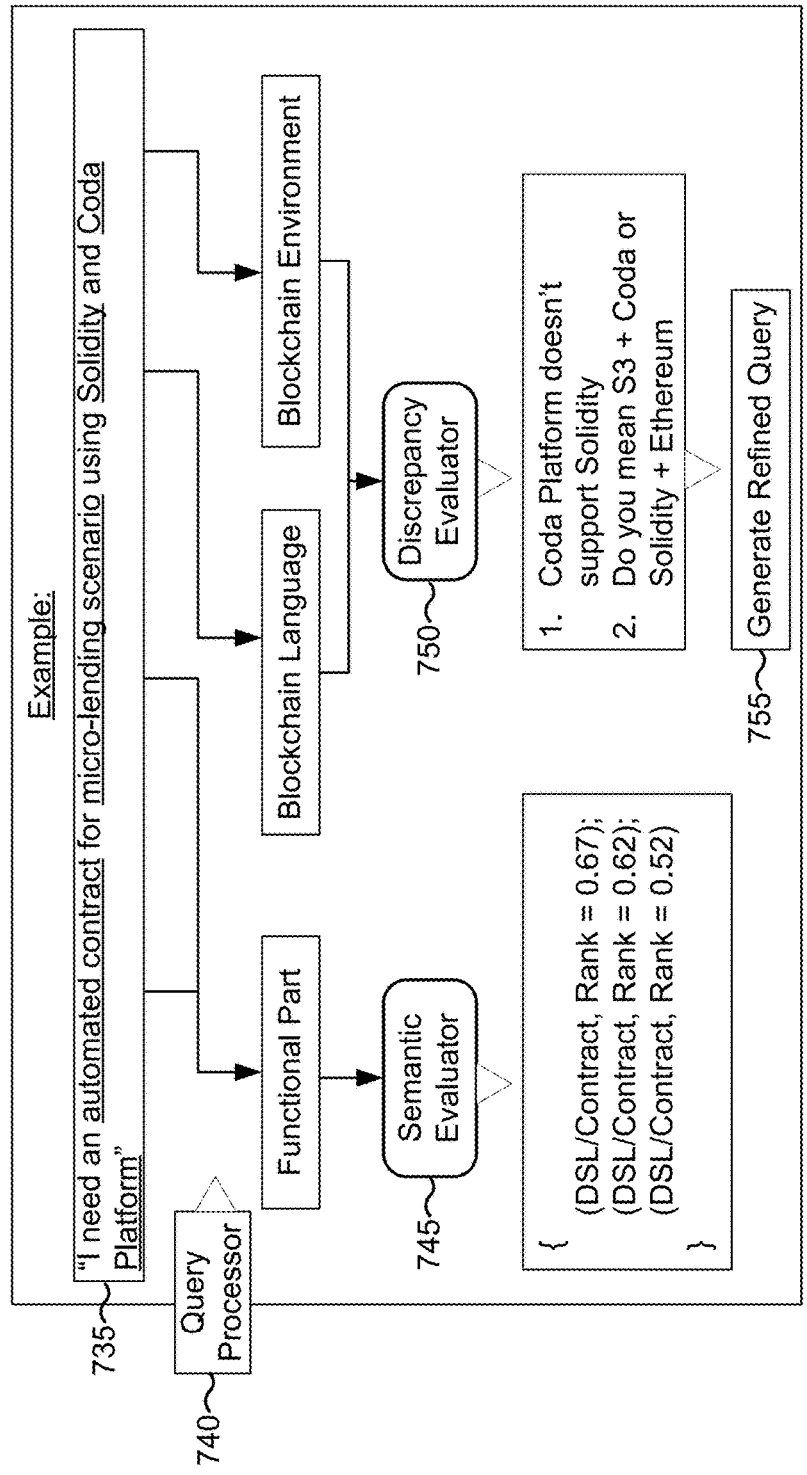

FIGS. 7A and 7B are diagrams of an example implementation 700 for processing queries relating to the example implementation shown in FIG. 6. FIG. 7A shows an example of processing a query based on a functional part of the query and an environment part of the query, and FIG. 7B shows an example of determining a processed or refined query based on a query processor, a semantic evaluator, and a discrepancy evaluator.

As shown in FIG. 7A, and by reference number 705, a query may be associated with a functional part. The functional part may identify a function, action, or condition associated with a desired smart contract or DSL. For example, the functional part may include "smart contract," "auditing receipts," "pay interest," and so on. As shown by reference number 710, analysis platform 220 may analyze the functional part using a semantic similarity technique to identify DSL units that are associated with tags that are semantically similar to the functional part of the query.

As shown by reference number 715, a query may be associated with an environment part. The environment part may identify attributes associated with an environment of the desired smart contract or DSL unit. For example, the environment part may include blockchain environment-related keywords (shown by reference number 720), blockchain language names (shown by reference number 725), and/or the like. As shown by reference number 730, analysis platform 220 may analyze the environment part using a keyword-based technique. For example, analysis platform 220 may identify DSL units or smart contracts associated with keywords or tags that match keywords of the environment part. In some implementations, analysis platform 220 may determine an appropriate smart contract or DSL unit based on a combination of the functional part and the environment part. For example, analysis platform 220 may determine respective scores for results based on the functional part and the environment part, and may determine an appropriate result (e.g., DSL unit or smart contract) based on a combination of the respective scores (e.g., average, weighted average, etc.).

As shown in FIG. 7B, and by reference number 735, assume that analysis platform 220 receives a query of "I need an automated contract for micro-lending scenario using Solidity and Coda Platform." As shown by reference number 740, a query processor of analysis platform 220 may divide the query into functional parts (e.g., "automated contract" and "micro-lending scenario") and environment parts of a target language (e.g., Solidity) and a blockchain environment (e.g., Coda platform). As shown by reference number 745, analysis platform 220 may determine semantic scores for DSL units and/or smart contacts using a semantic evaluator. For example, the semantic evaluator may determine a semantic similarity of the functional part to tags or keywords associated with the DSL units and/or contracts.

As shown by reference number 750, a discrepancy evaluator may determine discrepancies between environment parts of the query. Here, the discrepancy evaluator determines that the Coda platform does not support Solidity. For example, the discrepancy evaluator may determine discrepancies based on a data structure identifying target languages and corresponding blockchain environments. As further shown, the discrepancy evaluator may provide information suggesting different combinations of target languages and blockchain environments (e.g., S3+Coda or Solidity+ Ethereum). As shown by reference number 755, analysis platform 220 may generate a refined query based on the different combinations. For example, analysis platform 220 may receive an indication of a selected combination from the different combinations, and may revise the query, as a refined query, to identify the selected combination. In this way, analysis platform 220 improves accuracy of search queries using the discrepancy evaluator, thereby reducing a number of erroneous queries and conserving system resources that would otherwise be used to process erroneous queries.

As indicated above, FIGS. 7A and 7B are provided merely as an example. Other examples are possible and may differ from what was described with regard to FIGS. 7A and 7B.

Figure 8:
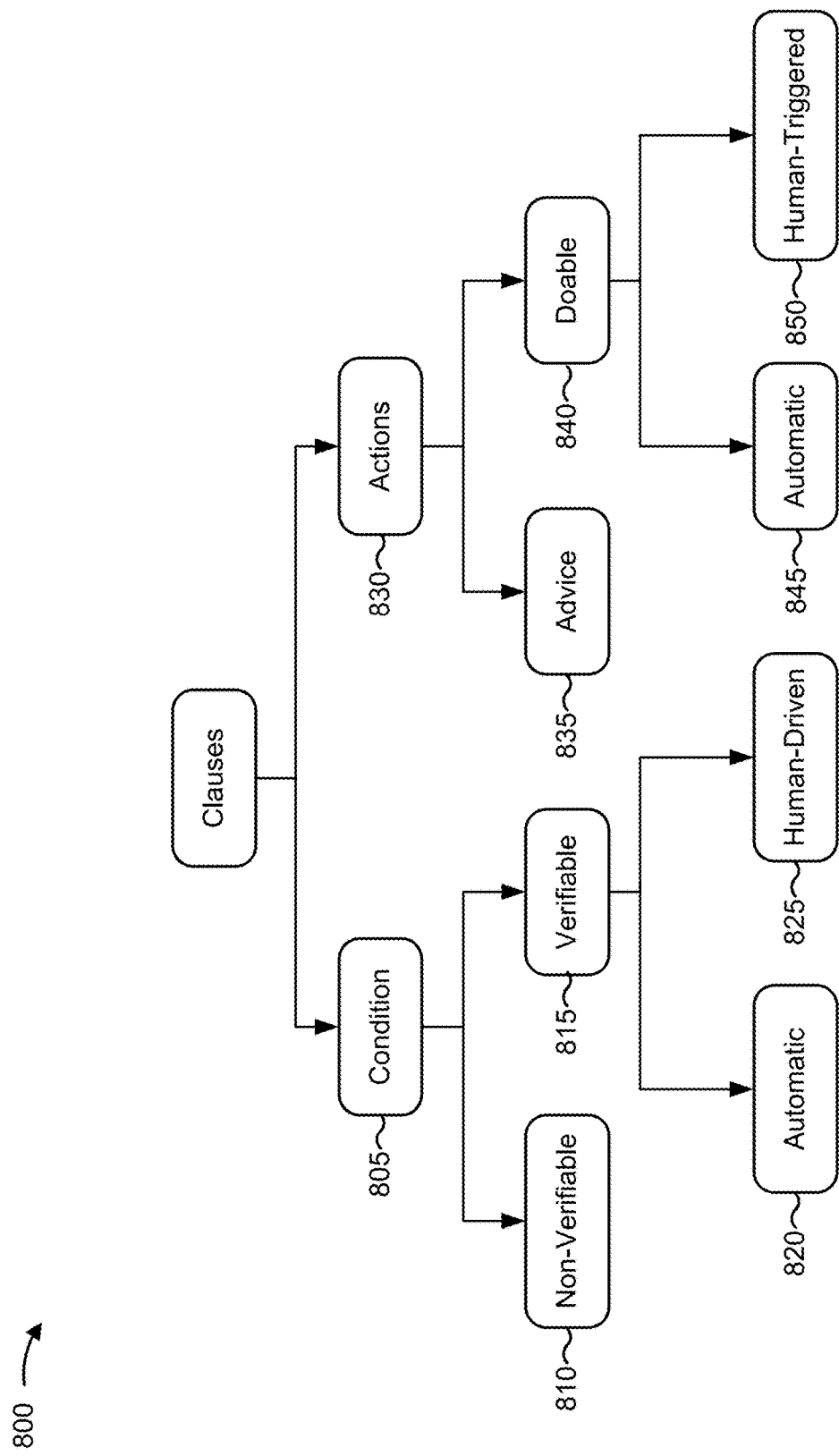
FIG. 8 is a diagram of an example of clause characteristics for classifying clauses as digitizable, semi-digitizable, or non-digitizable.

FIG. 8 is a diagram of an example 800 of clause categories for classifying clauses as digitizable, semi-digitizable, or non-digitizable. The categories described in FIG. 8 may be determined based on natural language processing, such as a Stanford NLP system or a similar NLP system. The part-of-speech tags identified in FIG. 8 are associated with the Stanford NLP system. As shown in FIG. 8, and by reference number 805, a clause may include a condition. As shown by reference number 810, some conditions may be non-verifiable. In some implementations, analysis platform 220 may identify a non-verifiable condition by identifying a verb (e.g., VBZ (Verb, 3rd person singular present) or VBN (Verb, past participle)) of a sentence in which the verb is included. Examples of non-verifiable conditions include: "The Borrower declares that the information and data furnished by it to the Lender are true and correct;" and "The Borrower shall utilize the said Loan only for the purpose as stated in the registration and the loan shall not be utilized for any other purpose." A clause including a non-verifiable condition may be a non-digitizable clause, since a smart contract may not be capable of enforcing a non-verifiable condition.

As shown by reference number 815, some conditions may be verifiable conditions. A verifiable condition may include a condition that can be enforced by a smart contract (e.g., an automatic verifiable condition, shown by reference number 820) or a human-driven action (e.g., a human-driven verifiable condition, shown by reference number 825). In some implementations, analysis platform 220 may identify an automatic verifiable condition based on identifying a verb (e.g., VB) and a noun (e.g., NNP) in a particular sentence. In some implementations, analysis platform 220 may identify a human-driven verifiable condition based on identifying a modal verb (e.g., must, shall, will, etc.) in a particular sentence.

In some implementations, and as shown by reference number 830, a clause may include an action. As shown by reference number 835, some actions may be related to furnishing advice (e.g., providing advice regarding a condition or subject associated with a clause). As shown by reference number 840, some actions may be doable actions. A doable action may be an action that can be performed by a smart contract or a human actor. For example, an action that can be performed by a smart contract may be termed an automatic action (shown by reference number 845). In some implementations, analysis platform 220 may identify an automatic action based on detecting a proper simple sentence. An action that can be performed or triggered by a human actor may be termed a human-triggered action (shown by reference number 850). In some implementations, analysis platform 220 may identify a human-triggered action based on identifying a verb (VBZ or VBN) and a modal verb (must, will, shall, etc.) in a clause (e.g., when the clause is associated with a human-driven condition). In some implementations, analysis platform 220 may identify a human-triggered action based on identifying a verb (e.g., VP (verb phrase), a noun (e.g., NNP), and a modal verb. In such a case, the clause may be associated with an automatic condition.

In some implementations, analysis platform 220 may determine whether a clause is digitizable, semi-digitizable, or non-digitizable based on a combination of the categories associated with the condition of the clause and the action of the clause. For example, analysis platform 220 may determine that a clause containing a non-verifiable condition is non-digitizable. In some implementations, analysis platform 220 may determine that a clause containing a verifiable condition and a human-triggered action is semi-digitizable. In some implementations, analysis platform 220 may determine that a clause containing a human-driven verifiable condition and a human-triggered action is semi-digitizable. In some implementations, analysis platform 220 may determine that a clause containing an automatic verifiable condition and an automatic action is digitizable. In this way, analysis platform 220 may automatically identify, using natural language processing, clauses of document that are digitizable, semi-digitizable, or non-digitizable, thereby enabling the selective generation of smart contracts based on the clauses.

As indicated above, FIG. 8 is provided merely as an example. Other examples are possible and may differ from what was described with regard to FIG. 8.

In this way, analysis platform 220 enables the automatic analysis of a document to generate and deploy smart contracts based on the document. This may be particularly useful in fields involving many contractual clauses, such as micro-loan distribution, trading, and/or the like. Furthermore, analysis platform 220 automates a process, that was previously performed by a human actor, using a rigorous and technical approach (e.g., the selection of clauses appropriate for digitization, and the digitization of those clauses using smart contracts). Furthermore, analysis platform 220 may simplify the enforcement of contracts, particularly contracts involving the exchange of digital data, by automatically generating and deploying smart contracts based on content of the contracts.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive a document that includes a plurality of clauses relating to two or more entities;
   extract or identify a first selected clause and a second selected clause, of the plurality of clauses, based on a characteristic of the first selected clause and a characteristic of the second selected clause;
   determine that the first selected clause is digitizable or semi-digitizable based on the characteristic of the first selected clause;
   determine that the second selected clause is non-digitizable based on the characteristic of the second selected clause;
   generate, based on determining that the first selected clause is digitizable or semi-digitizable and that the second selected clause is not digitizable, a domain-specific language (DSL) unit identifying the two or more entities and one or more values associated with the first selected clause;
   automatically generate a smart contract, based on the DSL unit, that is configured to enforce a condition or action, of the one or more values, between the two or more entities; and
   perform an action based on the smart contract.

2. The device of claim 1, wherein the one or more processors are further to:
   determine one or more tags associated with the smart contract,
      the one or more tags being based on at least one of the two or more entities, the one or more values, or the smart contract, and
      the one or more tags being generated based on a layered tagging approach; and
   store the smart contract based on the one or more tags.

3. The device of claim 1, wherein the one or more processors are further to:
   generate a user interface for a user input relating to enforcing the condition or action,
      the user interface being generated based on the selected clause.

4. The device of claim 1, wherein the one or more processors are further to:
   generate a blockchain environment for deployment of the smart contract based on the document.

5. The device of claim 1, wherein the one or more processors are further configured to:
   selecting a blockchain environment, from a plurality of blockchain environments, for deployment of the smart contract.

6. The device of claim 5, wherein the blockchain environment is selected based on permissions identified by the document.

7. The device of claim 1, wherein determining that the second selected clause is not digitizable based on whether a condition or action, associated with the second selected clause, is automatic, human-driven, or human-triggered.

8. The device of claim 1, wherein the one or more processors, when determining that the first selected clause is digitizable or semi-digitizable, are to:
   determine, based on a first score assigned to the first selected clause, that the first selected clause is to be included in the smart contract; and
   wherein the one or more processors, when determining that the second selected clause is not digitizable, are to:
   determine, based on a second score assigned to the second selected clause, that the second selected clause is not digitizable.

9. A method, comprising:
receiving, by a device, a document that includes a plurality of clauses relating to two or more entities;
extracting or identifying, by the device, a first selected clause and a second selected clause, of the plurality of clauses, based on a characteristic of the first selected clause and a characteristic of the second selected clause;
determining, by the device, that the first selected clause is digitizable or semi-digitizable based on the characteristic of the first selected clause;
determining by the device, that the second selected clause is non-digitizable based on the characteristic of the second selected clause;
generating, by the device and based on determining that the first selected clause is digitizable or semi-digitizable and that the second selected clause is not digitizable, a domain-specific language (DSL) unit identifying the two or more entities, associated with the first selected clause, and a condition or action, identified by the first selected clause, associated with the two or more entities;
automatically generating, by the device, a smart contract, based on the DSL unit, that is configured to enforce the condition or action associated with the two or more entities;
deploying, by the device, the smart contract to a blockchain environment associated with the two or more entities; and
performing, by the device, an action based on the smart contract after deploying the smart contract.

10. The method of claim 9, further comprising:
determining permissions associated with the two or more entities based on the document; and
selecting, based on the permissions, the blockchain environment from one or more open blockchain environments or one or more permission-based blockchain environments,
wherein deployment the smart contract to the blockchain environment is based on selecting the blockchain environment.

11. The method of claim 9, wherein the generating of the DSL unit is based on mapping the condition to the two or more entities.

12. The method of claim 9, further comprising:
determining links based on the document,
the links being between different clauses or within the selected clause, and
the links identifying a relationship between a particular condition or action, a pair of entities of the two or more entities, and an object associated with the particular condition or action.

13. The method of claim 12, wherein the smart contract is determined based on the links.

14. The method of claim 9, further comprising:
identifying a third selected clause of the plurality of clauses;
generating a second smart contract based on the third selected clause; and
deploying the second smart contract to the blockchain environment.

15. The method of claim 9, wherein the DSL unit is determined based on a document model and a domain model,
the document model identifying a structure of the document or expected content of the document, and
the domain model identifying characteristics or attributes of a domain associated with the document.

16. A non-transitory computer-readable medium storing instructions, the instructions comprising:
one or more instructions that, when executed by one or more processors, cause the one or more processors to:
receive a document that includes a plurality of clauses relating to two or more entities;
extract or identify a first selected clause and a second selected clause of the plurality of clauses;
determine that the first selected clause is digitizable or semi-digitizable based on a characteristic of the first selected clause and a characteristic of the second selected clause;
determine that the second selected clause is non-digitizable based on a characteristic of the second selected clause;
generate a domain-specific language (DSL) unit, based on determining that the first selected clause is digitizable or semi-digitizable and that the second selected clause is not digitizable, identifying the two or more entities and a condition or action;
automatically generate a smart contract, based on the DSL unit, that is configured to enforce the condition or action; and
deploy the smart contract to a blockchain environment for enforcement or performance of the condition or action.

17. The non-transitory computer-readable medium of claim 16, wherein the one or more instructions, when executed by the one or more processors, further cause the one or more processors to:
identify the two or more entities based on the document; and
determine information regarding the two or more entities,
the information regarding the two or more entities being determined based on an information source other than the document.

18. The non-transitory computer-readable medium of claim 17, wherein the one or more instructions, that cause the one or more processors to generate the smart contract, cause the one or more processors to:
generate the smart contract based on the information regarding the two or more entities.

19. The non-transitory computer-readable medium of claim 16, wherein the one or more instructions, when executed by the one or more processors, further cause the one or more processors to:
select the blockchain environment based on information regarding the two or more entities or based on information included in the document.

20. The non-transitory computer-readable medium of claim 16, wherein the one or more instructions, when executed by the one or more processors, further cause the one or more processors to:
store the smart contract with one or more tags determined based on the smart contract,
the one or more tags to facilitate searching of the smart contract based on information associated with the smart contract.

* * * * *